United States Patent
Demele et al.

(10) Patent No.: US 11,174,666 B2
(45) Date of Patent: *Nov. 16, 2021

(54) SMART SYSTEM FOR REMOTE OPENING AND CLOSING A DOOR OR WINDOW

(71) Applicants: Michael Paul Demele, Los Altos, CA (US); Adam Paul Smithline, Cupertino, CA (US)

(72) Inventors: Michael Paul Demele, Los Altos, CA (US); Adam Paul Smithline, Cupertino, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/297,621

(22) Filed: Mar. 9, 2019

(65) Prior Publication Data

US 2019/0292836 A1    Sep. 26, 2019

Related U.S. Application Data

(60) Provisional application No. 62/646,371, filed on Mar. 22, 2018, provisional application No. 62/728,799, filed on Sep. 9, 2018.

(51) Int. Cl.
| | |
|---|---|
| *E05F 11/34* | (2006.01) |
| *E05F 15/73* | (2015.01) |
| *E05F 15/632* | (2015.01) |
| *E05F 15/616* | (2015.01) |
| *E05B 63/18* | (2006.01) |
| *E05F 15/77* | (2015.01) |
| *G05D 3/12* | (2006.01) |

(52) U.S. Cl.
CPC ............ *E05F 15/73* (2015.01); *E05B 63/185* (2013.01); *E05F 15/616* (2015.01); *E05F 15/632* (2015.01); *E05F 15/77* (2015.01); *G05D 3/12* (2013.01); *E05F 2015/767* (2015.01); *E05Y 2900/132* (2013.01); *E05Y 2900/148* (2013.01)

(58) Field of Classification Search
CPC ....... E05F 15/73; E05F 15/632; E05F 15/616; E05F 15/77; E05F 15/652; E05F 2015/767; E05Y 2900/148; E05Y 2900/132; E05B 63/185; E05B 2047/0094; E05B 47/00; E05B 55/0888
USPC .................................................... 49/360, 362
See application file for complete search history.

(56) References Cited

U.S. PATENT DOCUMENTS

| | | |
|---|---|---|
| 2,721,361 A | 10/1955 | Ryan et al. |
| 3,085,300 A | 4/1963 | Carlston |
| 3,779,588 A | 12/1973 | Raymon |

(Continued)

OTHER PUBLICATIONS

Popper, Ben, "Amazon Key is a new service that lets couriers unlock your front door," The Verge, Oct. 25, 2017, URL: https://www.theverge.com/2017/10/25/16538834/amazon-key-in-home-delivery-unlock-door-prime-cloud-cam-smart-lock, 5 Pages, Downloaded Mar. 9, 2019.

*Primary Examiner* — Jerry E Redman

(57) ABSTRACT

A smart window/door opening-closing device that can easily be installed for use with an existing door or window or can be built-in by the door or window manufacturer, can be programmed to activate the opening or closing of the door or window either (a) remotely, (b) automatically by a pet and/or (c) automatically by a voice command, is easily disengaged when use is not desired, provides safety and security to prevent unwanted opening or closing of the door or window, and is integrated with a wireless communication network to enable smart and remote control of the window/door actuator.

26 Claims, 11 Drawing Sheets

(56) References Cited

U.S. PATENT DOCUMENTS

| | | | |
|---|---|---|---|
| 3,890,744 A | 6/1975 | Galis | |
| 3,956,911 A | 5/1976 | Carboud | |
| 4,073,517 A | 2/1978 | Bills | |
| 4,635,976 A | 1/1987 | Sigler | |
| 4,699,406 A | 10/1987 | Swanson | |
| 5,209,018 A | 5/1993 | Heinrich | |
| 5,355,624 A | 10/1994 | Bacon | |
| 5,356,185 A | 10/1994 | Cameron | |
| 5,422,552 A | 6/1995 | Parisi | |
| 5,464,261 A | 11/1995 | Alkhoury | |
| 6,126,211 A | 10/2000 | Dominquez | |
| 6,422,287 B1 | 7/2002 | Wilke | |
| 8,595,977 B2 | 12/2013 | Hancock et al. | |
| 8,752,870 B2 | 6/2014 | Wolf | |
| 9,160,220 B2 | 10/2015 | Cavalcante | |
| 9,610,830 B2 | 4/2017 | Orton et al. | |
| 9,725,941 B2 | 8/2017 | Van Tassell | |
| 10,718,150 B2 | 7/2020 | Hall et al. | |
| 10,822,857 B2 | 11/2020 | Hall et al. | |
| 11,035,166 B2 * | 6/2021 | Demele | E05F 15/632 |
| 2002/0144465 A1 | 10/2002 | Chang | |
| 2002/0157318 A1 | 10/2002 | Teubert et al. | |
| 2004/0244295 A1 | 12/2004 | Derham et al. | |
| 2007/0234643 A1 | 10/2007 | Siegal et al. | |
| 2008/0163553 A1 | 7/2008 | Liao | |
| 2009/0025296 A1 | 1/2009 | Petner | |
| 2012/0023827 A1 | 2/2012 | Hancock et al. | |
| 2012/0167469 A1 | 7/2012 | Maltaverne et al. | |
| 2014/0047768 A1 | 2/2014 | Vaknin et al. | |
| 2017/0074021 A1 | 3/2017 | Rodems et al. | |
| 2017/0101816 A1 | 4/2017 | Kozonasky | |
| 2017/0328126 A1 | 11/2017 | Bonge, Jr. | |
| 2018/0363356 A1 | 12/2018 | Hohwart | |
| 2019/0066045 A1 | 2/2019 | Cantrell | |
| 2019/0098874 A1 | 4/2019 | Burton | |
| 2019/0162007 A1 | 5/2019 | Hall et al. | |
| 2019/0162009 A1 | 5/2019 | Hall et al. | |
| 2019/0292836 A1 | 9/2019 | Demele et al. | |
| 2019/0309559 A1 | 10/2019 | Hall et al. | |
| 2019/0309560 A1 | 10/2019 | Hall et al. | |
| 2019/0309561 A1 | 10/2019 | Hall et al. | |
| 2019/0309562 A1 | 10/2019 | Hall et al. | |
| 2020/0131837 A1 | 4/2020 | Hall et al. | |
| 2020/0347660 A1 | 11/2020 | Ladani et al. | |
| 2020/0362616 A1 | 11/2020 | Demele et al. | |

* cited by examiner

SMART SYSTEM FOR REMOTE OPENING AND CLOSING A DOOR OR WINDOW

CROSS REFERENCE TO RELATED APPLICATIONS

This application claims priority to U.S. Provisional Application No. 62/646,371, entitled "Remote Mobile Operated Actuator Sliding Door," filed Mar. 22, 2018 and U.S. Provisional Application Ser. No. 62/728,799, entitled "Remote Mobile Operated Actuator Sliding Door with Embeddable Option," filed Sep. 9, 2018, both of which are incorporated by reference herein for all purposes.

FIELD OF THE INVENTION

The present application is directed to a system for remote opening and closing of a door or window, and more particularly, to a smart window/door system that (1) can easily be retrofitted for use with an existing door or window or can be built-in by the door or window manufacturer, (2) can be programmed to activate the opening or closing of the door or window either (a) remotely, (b) automatically by a pet and/or (c) automatically by a voice command, (3) is disengaged when use is not desired, (4) provides safety and security to prevent unwanted opening or closing of the door or window, and (5) is integrated with a wireless communication network to enable smart and remote control of the window/door actuator.

DESCRIPTION OF RELATED ART

In modern life, there are a number of trends, including more and more families having (1) two working adults, (2) pets that are home alone during major portions of the day and (3) package deliveries for online purchases while no one is home. These trends give rise to a number of safety and security concerns.

Pets often need access to outside spaces, such as the backyard, to exercise and/or relieve themselves when no one is home. One known approach is to leave a door or window, such as a sliding patio door, at least partially open, so the pet can freely exit from and enter into the residence. The drawback to this approach is unwanted intruders, including unwanted animals, bugs, flies or people can also enter the residence. Also, depending on the weather and/or season, leaving a door or window open all day long may be impractical, especially during rainy or windy conditions, or during the winter or summer months when the outside temperature is either cold or hot and/or humid. A so called "doggie" door is a known alternative to leaving a door or window open. With a doggie door, a trained pet can exit and enter the residence when they wish. The drawback with doggie doors is that they are expensive to install, requiring structural modifications (i.e., cut a hole, replace a pane, etc.) to either a wall or a door, do not prevent other unwanted animals from entering the residence, can potentially be used by an intruder to gain access into the residence, and typically provide poor weather performance (e.g., may leak in the rain, allow hot or cold air into the residence, etc.)

Packages delivered by carriers such as UPS, FedEx or US Postal are typically left at the door if no one is home, often in plain sight and unsecured. These packages are sometimes stolen by a passerby, or worse, by unscrupulous people who follow delivery trucks and then steal the delivered packages left at a door.

A smart window/door actuator that can be opened and closed by a pet, or can be remotely opened or closed by those living in a residence to allow egress and ingress by pets or the delivery of packages inside the residence, is therefore needed.

SUMMARY

A smart window/door opening-closing device that can easily be installed for use with an existing door or window or can be built-in by the door or window manufacturer, can be programmed to activate the opening or closing of the door or window either (a) remotely, (b) automatically by a pet and/or (c) automatically by a voice command, is easily disengaged when use is not desired, provides safety and security to prevent unwanted opening or closing of the door or window, and is integrated with a wireless communication network to enable smart and remote control of the window/door actuator.

BRIEF DESCRIPTION OF THE DRAWINGS

The present application and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not necessarily to scale.

DETAILED DESCRIPTION

The present application will now be described in detail with reference to a few non-exclusive embodiments thereof as illustrated in the accompanying drawings. In the following description, numerous specific details are set forth in order to provide a thorough understanding of the present disclosure. It will be apparent, however, to one skilled in the art, that the present discloser may be practiced without some or all of these specific details. In other instances, well known process steps and/or structures have not been described in detail in order to not unnecessarily obscure the present disclosure.

Figure 1A:
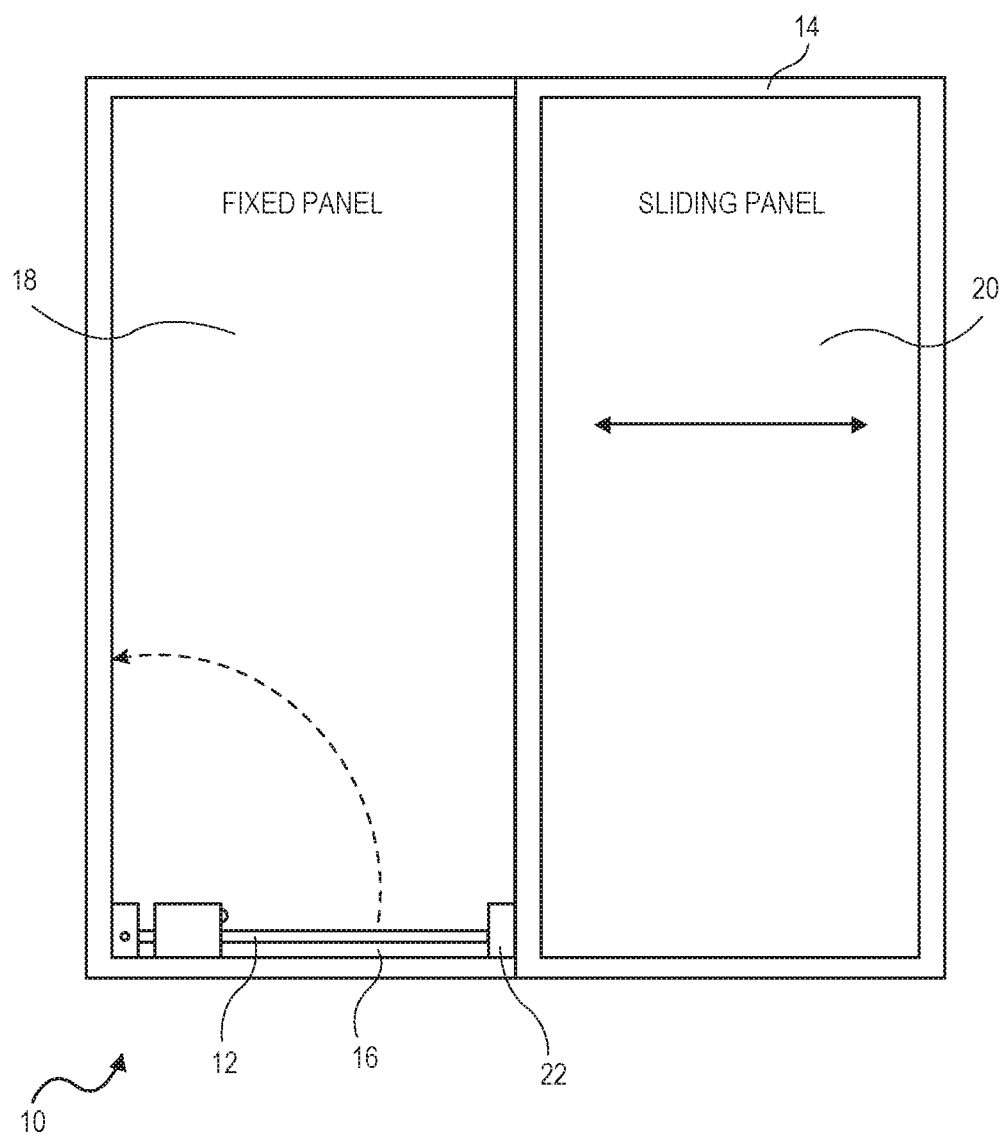
FIG. 1A is a diagram of a smart door or window opening-closing system retrofitted into an existing sliding door and placed in an operable position in accordance with a non-exclusive embodiment of the present invention.

Referring to FIG. 1A, a diagram 10 of a smart door or window opening-closing system 12 installed or retrofitted in an existing sliding door 14 is illustrated. The opening-closing system 12, as shown, is installed just above the track 16 adjacent to and at the base of a fixed pane 18 of the sliding door 14. As described in detail below, the opening-closing system 12 is in a horizontal, operable, position and is engaged with a sliding pane 20 of the sliding door 14. When in the operable position, the opening-closing system 12 can be used to open and close the sliding pane 20.

Figure 1B:
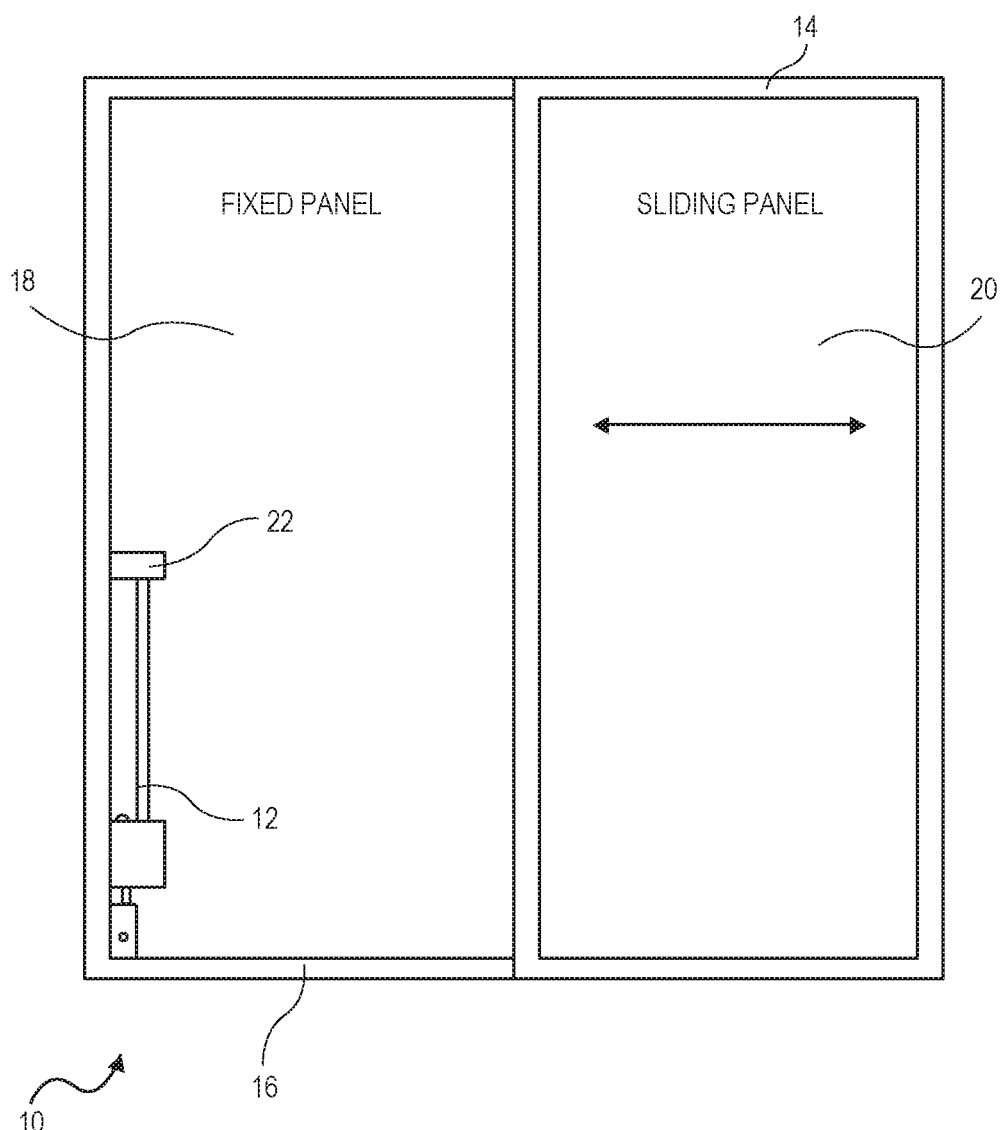
FIG. 1B is a diagram of the retrofitted smart door or window opening-closing system moved to an inoperable position in accordance with a non-exclusive embodiment of the present invention

Referring to FIG. 1B, a diagram 10 of the door or window opening-closing system 12 installed in the same sliding door 14 is illustrated. In this diagram, however, the opening-closing system 12 is rotated into a resting, inoperable, vertical position along the frame of the fixed pane 18 opposite the sliding pane 20. By rotating to the vertical position, the actuator 12 is disengaged with and is incapable of opening or closing the sliding pane 20. Instead, the sliding door can only be opened or closed manually.

The ability to selectively engage or disengage the opening-closing system 12 in the operable or inoperable position by simply rotating to either the horizontal or vertical position offers a number of benefits. Foremost, the occupant(s) of the residence or building in which the opening-closing system 12 is installed can easily move it between the operable and the inoperable position. For instance, when the occupant(s) are present, it may be more convenient for the opening-closing system 12 to be moved to the vertical, inoperable, position. On the other hand, when no one is present, it may be convenient to rotate the actuator 12 to the horizontal, operable, position, so that pets can exit or enter the building, or packages can be delivered inside the building.

It should be noted that although FIGS. 1A and 1B illustrates a sliding door, this should in no way be construed as a limitation. On the contrary, the opening-closing system 12 can be used with either a door or window of just about any type and size, including a sliding door, a swing door, a sliding window, casement window, etc. As such, the use of or reference to the term "door" or "window" should not be construed as limiting in any regard. On the contrary, the terms as used herein should be understood to be interchangeable and each should be broadly construed to include any type of door or window respectively, not just those that are described or illustrated herein.

Figure 2A:
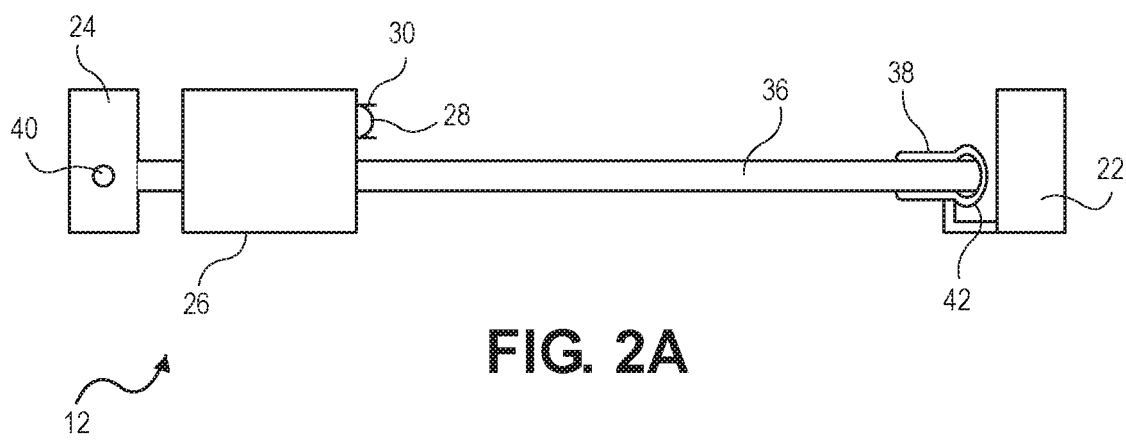
FIGS. 2A and 2B are diagrams of the smart door or window opening-closing system in accordance with a non-exclusive embodiment of the invention.
Figure 2B:
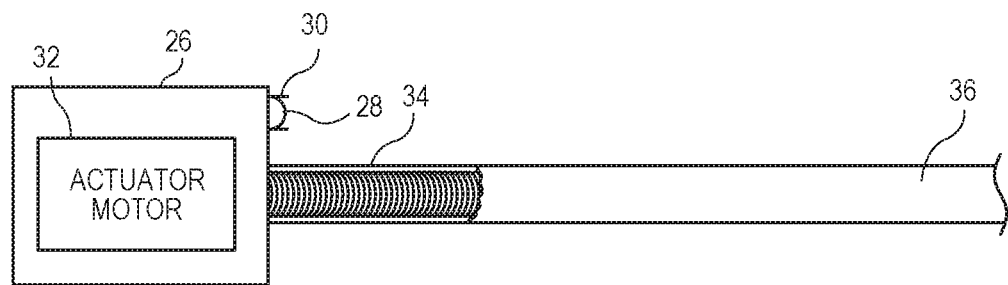

Referring to FIGS. 2A and 2B, diagrams of the opening-closing system 12 are illustrated. The opening-closing system 12 includes the first base 22, a second base 24, a housing 26, a sensor 28 provided on the housing 26, an adjustable shutter 30 provided adjacent the sensor 28, an actuator motor 32 provided inside the housing 26 for rotating a screw 34, an internally threaded actuator rod 36 that engages or is screwed onto the screw 34, an adaptor 38 provided at the end of the actuator rod opposite the housing 26, and a rotating connector 40 for connecting and allowing the housing 26, screw 34 and actuator rod 36 to all rotate about the rotating connector 40 provided in the second base 24.

The first base 22 is arranged to attach to the moving portion of the door or window that the opening-closing system 12 is intended to open and close. For instance, as provided in FIGS. 1A and 1B, the base 22 is attached to the sliding pane 20 of the sliding door 14. In various embodiments, the base 22 is attached to the moving portion of the door or window using any fastening mechanism, including but not limited to double-stick tape, screw(s), bolt(s), etc.

The base 22 includes a catch 42 for selectively latching the actuator rod 36 and the adaptor 38. With this arrangement, the actuator rod 36 and adaptor 38 can either be positioned horizontally to engage or lifted vertically to disengage the actuator rod 36 and actuator 38 from the catch 42 of the first base 22. In an alternative embodiment, the actuator rod 36 can directly engage and disengage the latch 42 of the base 22 without the use of the adaptor 38. Regardless of the embodiment, the opening-closing system 12 is capable of opening or closing the moving portion of the door or window when engaged and incapable of opening or closing the door or window when disengaged.

In yet another non-exclusive embodiment, the opening-closing system 12 can be supplied with multiple adaptors 38, each having a different length. The actuator rod 36 typically will have a fixed length, which may or may not provide an adequate fit for a particularly sized door or window. With multiple adaptors 38, each of different lengths, the most appropriate can be selected and attached to the end of the actuator rod 36. As a result, in spite of the actuator rod 36 being made with a fixed length, it can be used in cooperation with one of the adaptors 38 to fit a wide variety of different door and/or window sizes.

In various embodiments, the sensor 28 can be a still camera, a video or security camera or a Passive Infrared (PIR) sensor. An optional shutter 30, which either surrounds or is otherwise is positioned adjacent the sensor 28, is a mechanical device that may be provided to control the field of vision of the sensor 28. By either opening or closing the shutter 30, the view of the sensor 28 can be either enlarged or decreased. For instance, if it is preferred that the sensor 28 "see" just the area immediately near the door 14, then shutter is partially shut. On the other hand, if a wider field of view is preferred, then the shutter 30 is opened wider.

Figure 3:
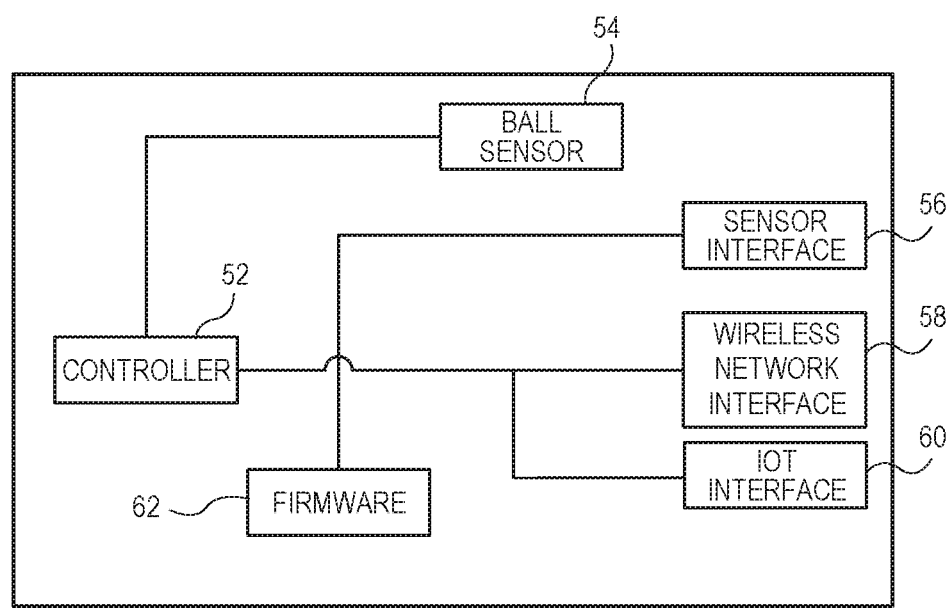
FIG. 3 is a logic block diagram of an electronic controller used in the smart door or window opening-closing system in accordance with a non-exclusive embodiment of the invention.

Referring to FIG. 3, a logic diagram of a controller system 50 included in the housing 26 of the opening-closing system 12 is shown. The controller system 50 includes a controller 52, a ball sensor 54, a sensor interface 56 for interfacing with the sensor 28 provided on the housing 26, a Wireless network interface 58, an optional Internet of Things (IoT) interface module 60 and firmware 62.

In various embodiments, the controller 52 is a microprocessor, microcontroller, programmable logic device such as a Field Programmable Gate Array (FPGA), logic circuitry, an integrated circuit, an Application Specific Integrated Circuit (ASIC) or module, or any combination thereof.

The firmware 62 is implemented in some form of memory or storage, such as but not limited to persistent or non-volatile memory, volatile memory, or a combination thereof. The firmware 62 is generally software or code used to control the operation of the controller 52 in response to the various sensors 54-60. In turn, the controller 52 controls the operation of the actuator motor 32 to rotate the screw 34 and actuator rod 36 to either open or close the sliding pane 20 of the door or window 14.

The ball sensor 54 is essentially a "ball circuit" that includes a small ball within an enclosure that is arranged to roll between a closed-circuit position and an open circuit position. When the opening-closing system 12 is positioned in the horizontal, operable, position, the ball moves within the enclosure to the closed-circuit position. When the opening-closing system 12 is moved to the vertical, inoperable, position, then the ball moves to the open circuit position. With this arrangement, the ball sensor 54 is used to signify to the controller 52 the opening-closing system 12 is in either the operable or inoperable position. When operational, the actuator motor 32 and the controller system 50 and are powered on by a power source (not illustrated), such as batteries or a power cord to a standard wall electrical outlet. When not operational, the actuator motor 32 and the controller system 50 can either be powered off completely or placed in a power saving standby or sleep mode.

The sensor interface 56 is designed to operate in cooperate with the sensor 28 provided on the housing 26. As previously noted, the sensor 28 can be a still camera, a video or security camera or a PIR sensor. The sensor interface 56 thus provides to the controller 52 data indicative of still images, video images and/or infrared signals, depending on the type of sensor 28.

The wireless network interface 58 is provided to enable bi-directional communication between the controller 52 and one or more remote communication device(s) over a wireless network. In various embodiments, as is described in more detail below, the remote communication device(s) may include indoor and/or outdoor security camera(s), a voice-activated personal digital assistant (e.g., Alexa by Google, Amazon Echo, Apple Siri, etc.), an application running on a computing device (e.g., smart phone, tablet computer, laptop or desktop computer, etc.), or an identifier tag (e.g., RFID or Bluetooth) attached to or associated with a pet.

The IoT interface 60 module enables the opening-closing system 12, and in particular the controller 52, to be connected as a "Thing" among the IoT. With the IoT interface module 60 receiving signals and commands interpreted by the firmware, the firmware then imposes open and close commands through the controller 52, which in turn, controls the actuator motor 32 to open or close the door. Thus, the IoT interface module 60 can communicate and interact over the Internet with the aforementioned remote devices and be remotely monitored and controlled. As is well understood in the art, the wireless network interface 58 and the IoT interface module 60 can be integrated together into a single interface. In a non-exclusive example, an integrated commercially available wireless network interface 58 and IoT interface module 60 is the Imp 004 offered by a company called Electric Imp, Los Altos, Calif.

Figure 4:
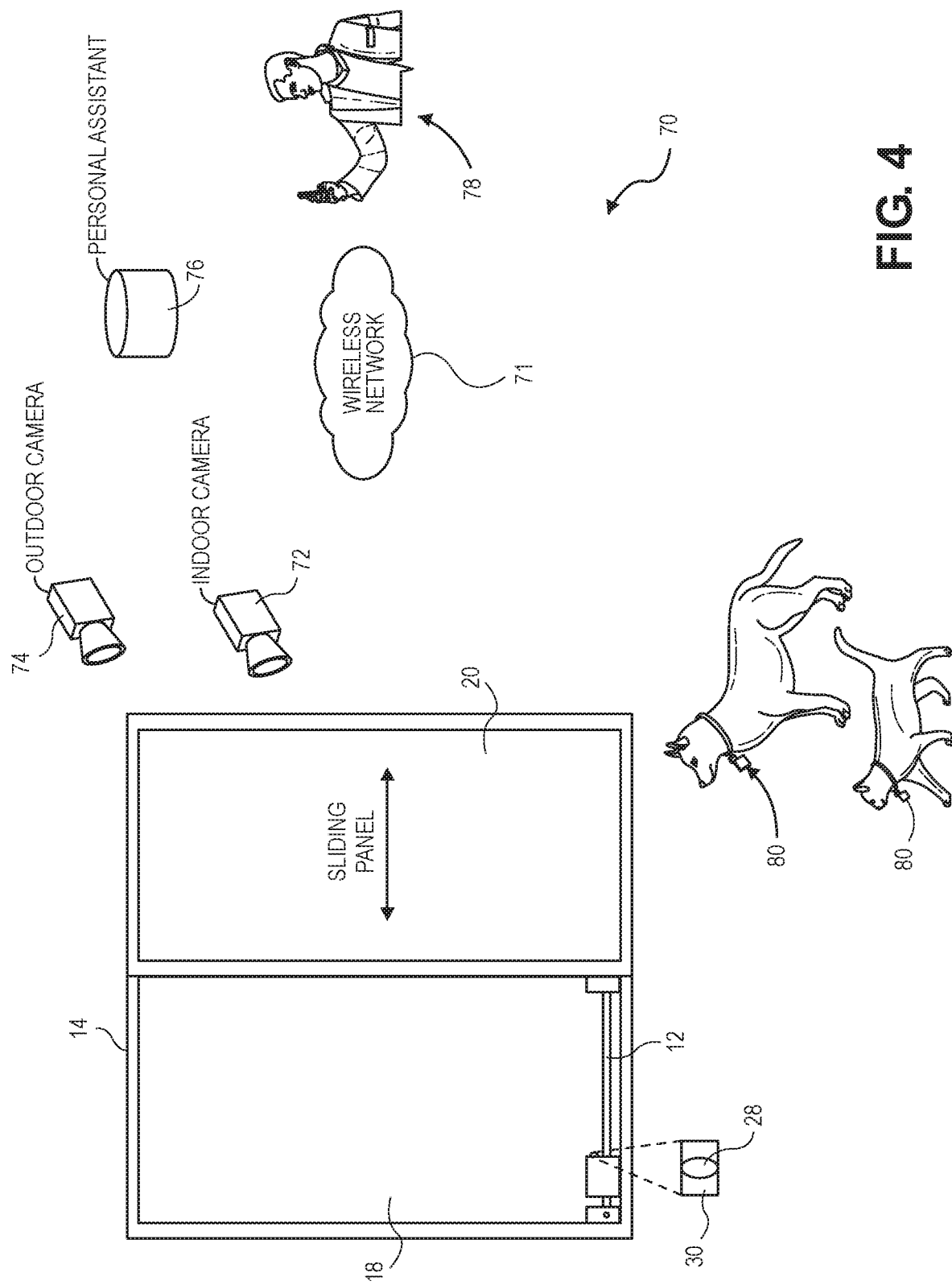
FIG. 4 is a diagram illustrating the smart door or window opening-closing system operating within a wireless network in accordance with a non-exclusive embodiment of the invention.

Referring to FIG. 4, a diagram 70 illustrating the door or window opening-closing system 12 operating as a Thing among the IoT is illustrated. In this particular embodiment, the opening-closing system 12 is arranged to interface over a wireless network 71 with an indoor camera 72, an outdoor camera 74, a personal digital assistant 76, an application (not illustrated) running on a computing device 78, such as a smart phone, and one or more identification tags 80, such as either a RFID tag or a Bluetooth tag, that is provided on the collar of a pet. In various embodiments, the wireless network 71 can be the Internet, a local area wireless network, a WiFi network, a Bluetooth network, a cellular network, or any combination thereof.

The remote monitoring and control of the opening-closing system 12 to either open or close the sliding pane 20 of the door 14 may be implemented in a number of ways. For instance:

(1) A pet may wander into the field of vision of the sensor 28. In response, the controller 52 generates a notice, for example in the form of a text message, that is sent via the wireless network 71 to the mobile phone 78 of a designated person, such the pet owner and/or resident of the home. In response, the person can send a reply command back to the opening-closing system 12, instructing the controller 52 to activate the actuator motor 32 to open the sliding pane 20 of door 14, letting the pet out of the residence.

(2) In other examples, the indoor camera 72 may recognize and/or the ID tag 80 worn by a pet may identify the pet near the inside of the door 14. If the controller 52 has been so instructed by commands processed by the firmware, then the controller 52 can automatically activate the actuator motor 32 to open the door 14, letting the pet out. Conversely, when the outdoor camera and/or ID tag 80 recognizes the pet near the outside of the door, then the controller can automatically activate the motor 32 to open the door again to let the pet inside.

(3) In a variation of the above example, the camera(s) 72, 74 and/or the ID tag 80 are used to recognize or identify a pet near the door. Instead of the controller 52 automatically opening or closing the door 14, a text message is sent to the mobile phone 78 of one or more designated person(s). In response, one of the designated person(s) can generate a command to either open the sliding pane 20 of the door 14 or maintain it closed, which is delivered to the controller 52 via the wireless network 71.

(4) The personal assistant 76 may also be used to either open or close the door 14. For example, consider the situation where the door 14 is a sliding patio door adjacent a kitchen. While a person is washing dishes or is otherwise preoccupied, the family pet wanders by the door 14 indicating a desire to go out into the backyard. In response to an "open door" voice command, the personal assistant 76 issues and sends over the wireless network 71 an electronic command to the controller 52, which in turn, activates the actuator motor 32 to open the sliding pane 20 of door 14, allowing the pet out. Similarly, when the pet indicates a desired to be let back in, an "open door" voice command is spoken to the personal assistant 76. In turn, the personal assistant 76 sends an electric command to the controller 52, which in response, opens the door to allow the pet back into the house.

(5) In certain circumstances, the controller 52 can be programmed to not open or close the door in response to the identification of a particular pet, regardless of how identified (e.g., by either camera 72, 74 and/or identifier tag, etc.). For instance, a family may have both a dog and a cat. The controller 52 may be preset or programmed to give the dog in/out privileges, but not the cat. Whenever the cat is identified near the door 14, the controller 52 will not open the door 14. On the other hand, when the dog is identified, the controller 52 will automatically open the door.

There are several issues or concerns involved with the operation of the opening-closing system 12.

One such concern is the detection of some type of obstruction along the track 16, such as a sleeping pet or a baby crawling through the doorway, etc. When there is an obstruction, then the opening-closing system 12 is preferably instructed to stop the closing of the door to prevent entrapment and/or injury.

Another issue is that over time, the mechanical force needed to open or close a given door or window will typically change for a number of reasons, such as wear and tear, a lack of lubrication of the opening/closing mechanism, changes in temperature during the course of a day (e.g., cold at night, warmer during the day), changes in temperature depending on the season of the year (e.g., cold in winter, warm in summer) or changes in humidity, etc.

The opening-closing system 12 is, in non-exclusive embodiments, tasked with differentiating between an actual obstruction and the door or window becoming increasingly more difficult to open or close due to wear and tear and/or the other operating conditions discussed above. If an actual obstruction exists, then the opening or closing of the door should be stopped. On the other hand if more force is required to open or close the door due to other circumstances, then the opening or closing of the door is typically continued.

The opening-closing system 12 may determine if an obstruction exists in a number of different ways. For example: (1) detecting an unusual spike in current or other electrical parameter of the actuator motor 32; (2) defining or setting a maximum force for the actuator motor 32 and stopping the opening or closing of the door or window if the force is exceeded, (3) using an electrical or mechanical fuse that is preset to "blow" if a predetermined electrical parameter or mechanical force is Exceeded and/or (4) using one or more of the sensors 28 and/or cameras 72, 74 to detect the obstruction and/or motion within the opening of the door or window.

Figure 5:
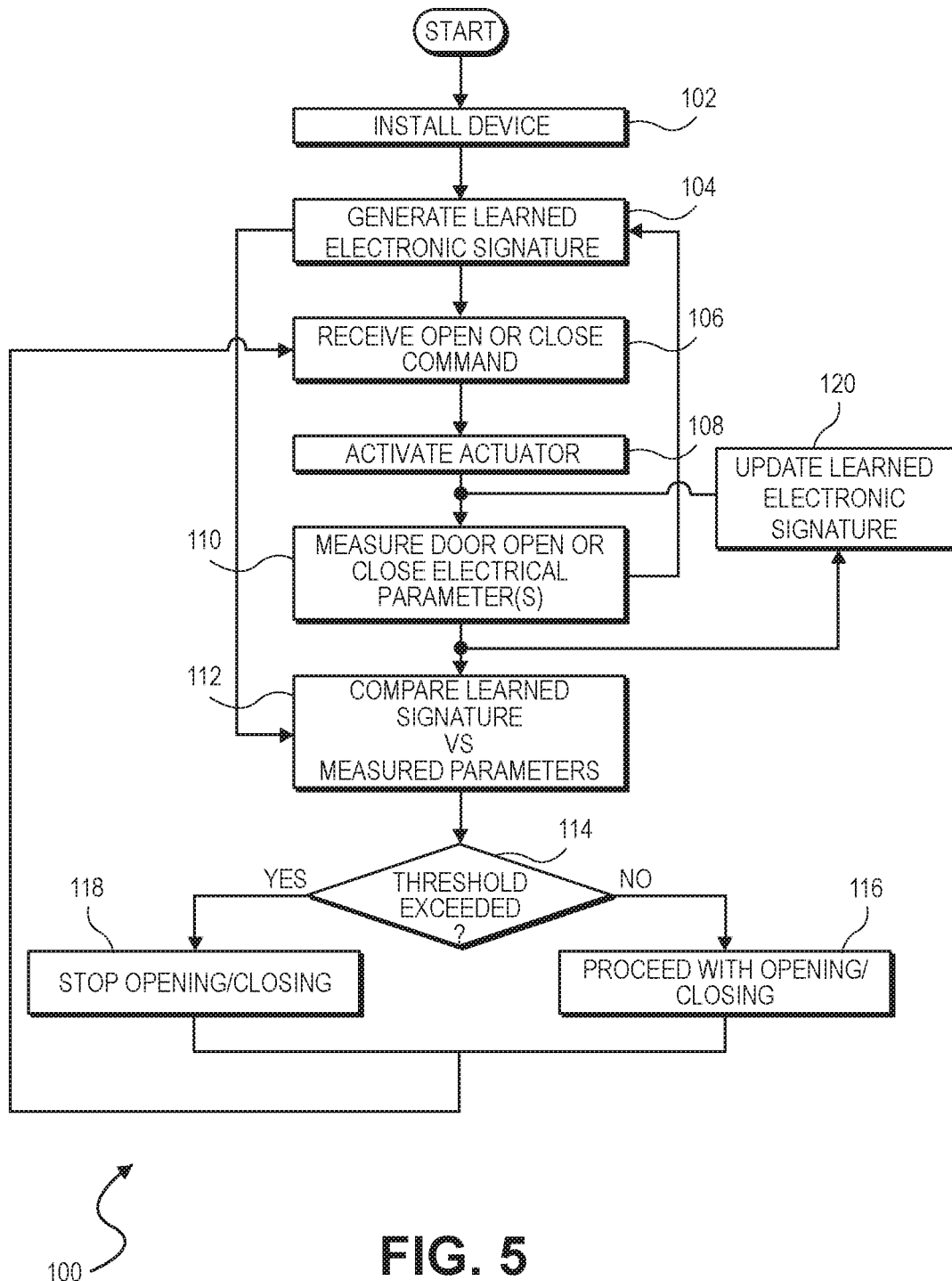
FIG. 5 is a flow diagram illustrating a learning mode of the door or window actuator in accordance with a non-exclusive embodiment of the invention.

Referring to FIG. 5, a flow diagram 100 illustrating a method for (1) learning and updating an electric signature for opening and closing a door or window 14 and (2) for obstruction detection is shown.

In an initial step 102, the opening-closing system 12 is installed in a door or window 14. In different embodiments, installation may mean either the opening-closing system 12 has been retro-fitted into an existing door or window or it can be installed in a factory when the door and/or window is made (as further described below).

In step 104, the opening-closing system 12 "learns" an electronic signature of the actuator motor 32 for opening and closing the door or window. The electronic signature is learned by performing one or more trial runs of opening and/or closing the door or window. Specifically, the electronic signature is learned during the trial runs by:

(a) Measuring an electric parameter of the actuator motor 32, such as the amount of current used, at discrete distance intervals (e.g., every ¼ or ½ of an inch) of travel of the actuator rod 36 during the trial opening(s) and/or closing(s) of the door or window; and (b) Averaging the measured electric parameter values for each of the measured discrete distance intervals over the several trial runs.

In the example provided above, the measured electrical parameter of the actuator motor 32 is current and the distance between each of the discrete intervals is ¼ of an inch. It should be understood, however, that neither of these is a strict requirement and that other electrical parameters (e.g., voltage, resistance, inductance, or a combination thereof, etc.) can be used and the distance between measurement points can widely vary as well and be smaller or larger than ¼ inch intervals (e.g., ⅛, ¾, 1 of an inch, etc). Once the electronic signature is learned, it is stored in a location accessible by the opening-closing system 12.

In step 106, the controller 52 receives an actual command (i.e., a non-trial command) to either open or close the door or window 14. In various embodiments, the command may be derived by any of the methods or procedures as described above.

In step 108, the controller 52 controls the operation of the actuator motor 32 to turn the screw 34 either in (1) a first rotational direction to retract the actuator rod 36 and open the door or window or (2) a second rotational direction to extend the actuator rod 36 when closing the door or window.

In step 110, the same electrical parameter(s) used to generate the learned electronic signature is/are measured at the same discrete distance intervals of travel of the actuator rod 36 as the door or window 14 is either opened or closed during the non-trial.

In step 112, the measured electrical parameters at each of the discrete distance intervals of travel of the actuator rod 36 are compared to the same averaged measurement at the same discrete interval included in the learned electrical signature respectively.

In decision 114, it is determined if one or more comparison(s) exceeds a threshold.

In step 116, the controller 52 controls the actuator motor 32 to proceed with the opening or closing of the door or window 14 if the threshold is not exceeded.

In step 118, on the other hand, the controller 52 directs the actuator motor 32 to stop with the opening or closing of the door or window 14 if the threshold is exceeded one or multiple times. When the threshold is exceeded one or multiple times, the controller 52 makes an assumption that either (a) the door or window 14 is hitting an obstruction during the attempt to either open or close the door or window or (b) the door or window is closed and locked when the attempt to open the door or window is made.

Finally, in step 120, if Step 116 is successful, the learned electronic signature is updated with the measured electrical parameter(s) at each of the discrete distance intervals with the measurements collected in step 110.

The above-described steps 106 through 120 are preferably repeated with each command to either open or close the door or window 14. With each non-trial opening or closing, the learned electronic signature is updated. By updating using measurements collected during non-trial openings and closings of the door or window 14, the learned electrical signature is updated over time. As a result, the updated learned electrical signature compensates for a wide variety of changing conditions, such as wear and tear, a state of maintenance of the door or window 14, varying temperatures, humidity levels, season of the year, etc.

In various embodiments, the threshold may be set at different values. For instance, if one or more measured parameter(s) exceeds the corresponding measured parameter(s) in the in the learned electronic signature by ten percent or more, then the threshold is considered exceeded. The threshold percentage, however, may widely vary depending on a desired sensitivity. If a high degree of sensitivity is desired, then the threshold percentage is reduced, meaning just a small deviation between the measured parameter(s) and the learned electronic signature is sufficient to stop an opening or closing. On the other hand, if less sensitivity is desired, then the threshold percentage can be raised, meaning a larger deviation is required to stop the opening or closing.

Also, the number of times the threshold needs to be exceeded to stop the opening or closing may also vary based on sensitivity or accuracy. In general, more times the threshold is exceeded, the more accurate the assumption there is an obstruction. The few times the threshold is exceed before stopping an opening or closing, the more sensitive, or potentially, the less accurate. The number of times the threshold is exceeded, in addition to the magnitude, can also used to trigger when the opening or closing of a door or window is stopped.

Figure 6:
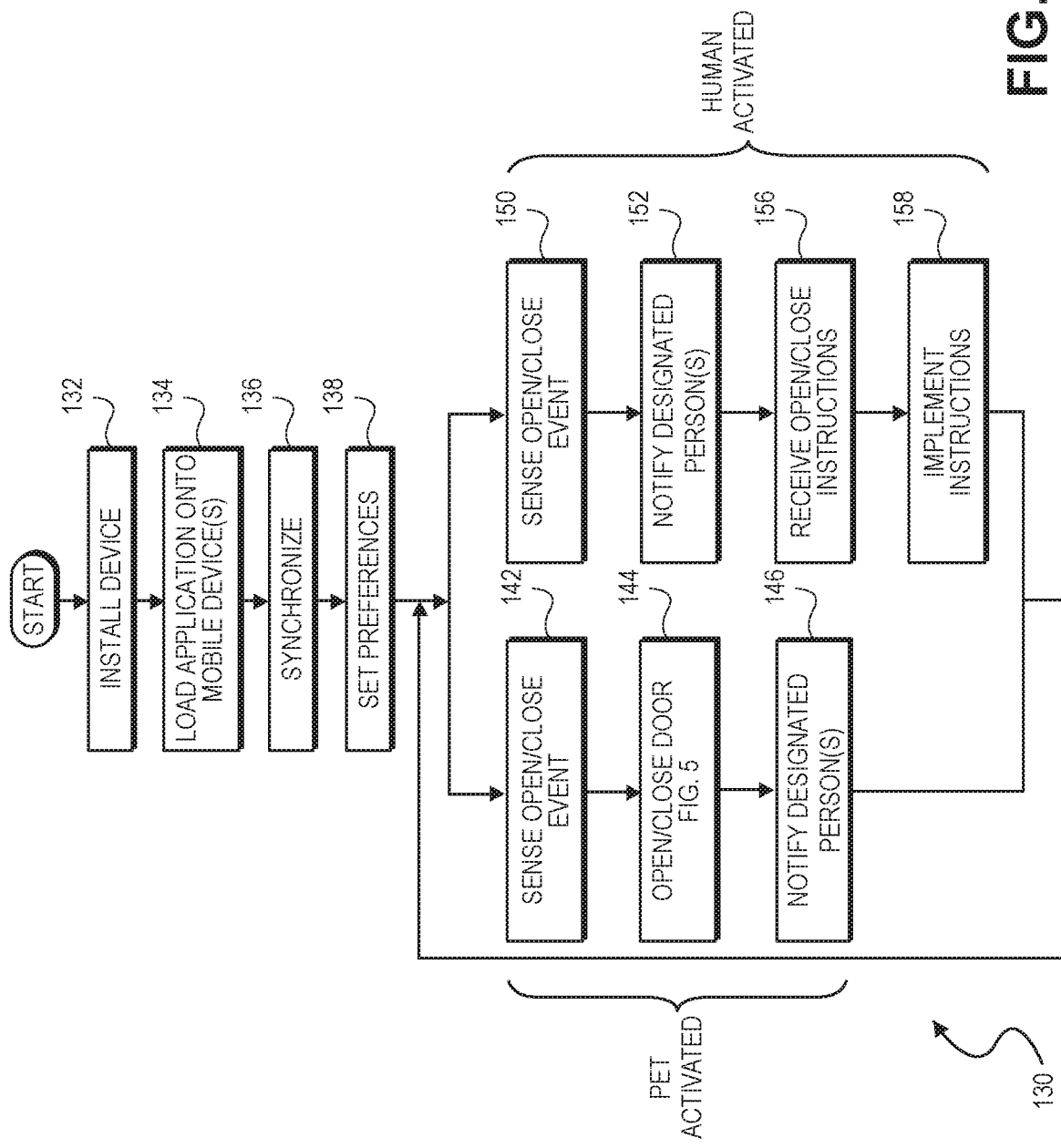
FIG. 6 is a flow diagram illustrating operation of the smart door or window opening-closing system in accordance with a non-exclusive embodiment of the invention.

Referring to FIG. 6, a flow diagram 130 illustrating set up and operation of the door or window opening-closing system 12 is illustrated.

In the initial step 132, the opening-closing system 12 is installed in a door or window. As previously noted, the installation may involve the retro-fitting into an already installed door or window in a building, such as a home, office or other structure. Alternatively, installation may mean integrating the installation at least partially inside the frame of the door or window 14 in the factory where the door or window is made. The door or window is then shipped to a building, again such as a home or office, were it is installed within the structure.

In step 134, an application or "app", intended to remotely interact with and control the opening-closing system 12, is installed on one or more computing devices 78 belonging to one or more persons. In various embodiments, the one or more computing devices may include smart phones, tablet computers, laptop computers, desktop computers, etc. The application or app is typically software or code intended to be executed on any of the above-listed devices and can be distributed to the one or more persons in a variety of ways, such as by downloading from a web site, via a hard storage medium such as a CD-ROM or memory stick, or can be downloaded from an "app store", such as Apple App Store or Google Play.

In step 136, each opening-closing system 12 is synchronized with each of the devices it is intended to interoperate with. Such devices may include, but is not limited to, the app running on one or more computing devices 78, one or more indoor camera(s) 72, one or more outdoor camera(s) 74, one or more personal assistant(s) 76, including RFID and/or Bluetooth tags (80). During the synchronization, certain credentials such as identifiers, IP addresses, and Wifi credentials are exchanged so that all the synchronized devices can communicate with one another over the wireless network 71, such as the Internet, a local area network, a Wifi network, or a combination thereof. In step 138, preferences for the opening-closing system 12 are set. Such preferences may include the person or people who may control the remote opening and closing of the door or window in which the device is installed, the hours of operation, the pet(s) that may or may not have exit or entry privileges. As noted above for example, a dog may be granted exit/entry privileges, while a cat may not. Other preferences may include setting a limit on how much the door or window 14 is opened, depending on who is attempting to enter or exit. For example, with a large dog, the setting may limit the opening of the door to 20 inches wide, but only 10 inches wide for a smaller dog.

In other non-exclusive embodiments, the settings may also include if a pet can automatically trigger the open and/or closing of the door or window 14 or if human intervention is required.

Similarly, in the case of package deliveries, the opening of the door may be limited to only a few inches to allow the insertion of a small package or envelope, but small enough to prevent the delivery person access through the door and into the building or residence. Alternatively, settings can be established to control how wide a door or window 14 is opened based on package size. Using either visual recognition and/or artificial intelligence, the size of a package can be estimated. In response, the opening-closing system 12 opens the door or window 14 just enough to receive the package. In a variation of this embodiment, the delivery person can scan a bar code provided on the package. In response, information detailing the dimensions of the package is wirelessly delivered over network 71 to the opening-closing system 12, which in turn, opens the door or window 14 the appropriate amount to accommodate the delivery of the package.

Steps 142-146 detail operation of the opening-closing system 12 when preferences are set for pet activation. Typically, the pet will initiate some behavior that the opening-closing system 12 determines as an open or close request event (Step 142). Such an event may include the pet approaching the door or window and being sensed by one or more of the sensors 28, one or more of the of the cameras 72 and/or 74, the opening-closing system 12 is notified via an identification tag 80, or some combination of the above. In response to the sensed request event, the system 12 operates the actuator motor 32 to either open or close the door or window (step 144) by implementing the steps 106 through 120 of FIG. 5 and a notice may optionally be sent to a designated person or persons (step 146) by way of app notification, text, email message or voice message.

Steps 150-158 detail operation of the opening-closing system 12 when preferences are set for human activation. With this scenario, an open or close event (step 150) is sensed by one or more of the sensors 28, indoor or outdoor camera(s) 72/74 and/or an ID tag 80. In response to the sensed event, the opening-closing system 12 notifies (step 152) one or more designated person(s) via a message such as an in-app notification, text message, voice or email message. In response the recipient is required to generate a command by way of app or voice controlled device instructing the opening or closing if the door or window 14 (step 156), which is typically delivered to the opening-closing system 12 via the wireless network 72. In response, the controller 52 opens or closes the door or window 14 (step 158) by implementing the steps 106 through 120 of FIG. 5.

After the synchronization step 136 and the set preferences step 138, the remaining steps 140-146 and/or 148-158 may be repeated each time an open/close event is sensed.

It should be noted that the synchronization step 136 and the set preferences step 138 may need to be repeated from time to time to synchronize with new equipment (e.g., new cameras, identifier tags, personal assistants, new mobile devices, etc.) and/or when changes the set preferences is desired.

Figure 7:
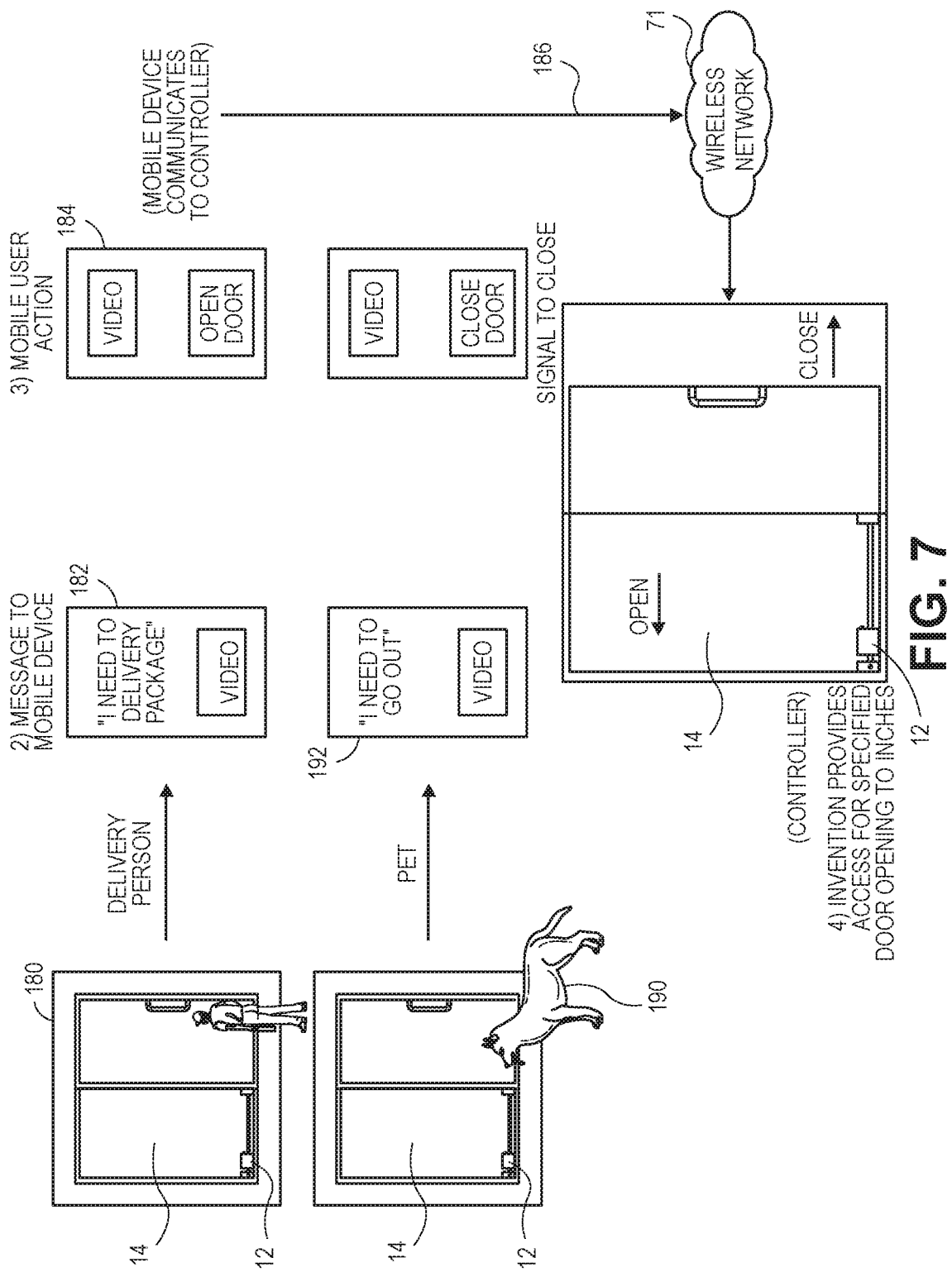
FIG. 7 illustrates several examples of operation of the smart door or window opening-closing system in accordance with non-exclusive embodiments of the invention.

Referring to FIG. 7, examples requiring human activation are illustrated.

In a first example, an arrival of a delivery person is sensed by an outdoor camera 74. In response, the opening-closing system 12 generates a message 182, such as a text message, which is sent to a mobile device 78 of one or more designated person(s) 184. In an optional embodiment, a barcode containing package information or visual recognition and artificial intelligence is used to determine the size of the package the delivery person is attempting to deliver. In response, one of the designated persons generates a remote command 186 to open the door or window 14 which is delivered via the wireless network 71 to the controller 52 of the opening-closing system 12. In turn, the system 12 activates the motor 32 to first open the door and then close the door after an adequate time period to deliver the package has lapsed. In embodiments where the size of the package is estimated, the controller 52 will open the door or window 14 just enough to readily accept the package, but preferably no wider. For example with an envelope, the door or window is opened just a few inches. But for a larger box or package, the door or window is opened a larger amount to accept the box or package.

In a second example also illustrated, a pet 190 triggers the generation of a message 192 by the opening-closing system 12 to the one or more designated persons in response to one of the video cameras 72, 74 and/or an ID tag 80. In reply, one of the designated persons may generate a command 186 to open or close the door or window 14 that is delivered via the wireless network 71.

In a variation of one or both of the examples above, media such as (1) video, (2) a still image and/or (3) a text message may be included in the messages 182, 192. In this way, the recipient will see and be informed of the sensed event that is triggering the request to either open or close the door or window 14.

Figure 8A:
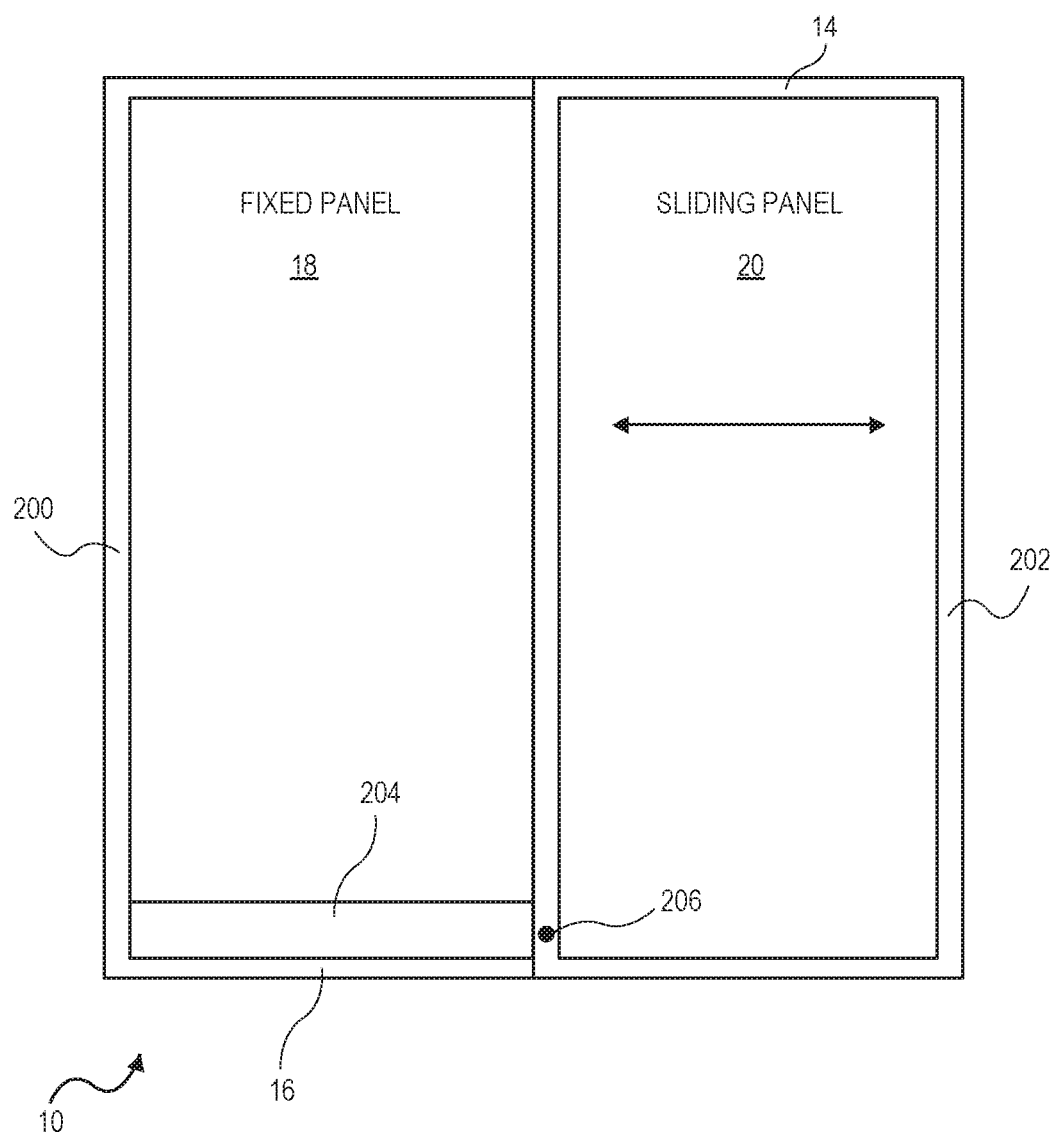
FIGS. 8A-8D illustrates another embodiment of a built-in smart door or window opening-closing system as fabricated by a door or window manufacturer.
Figure 8B:
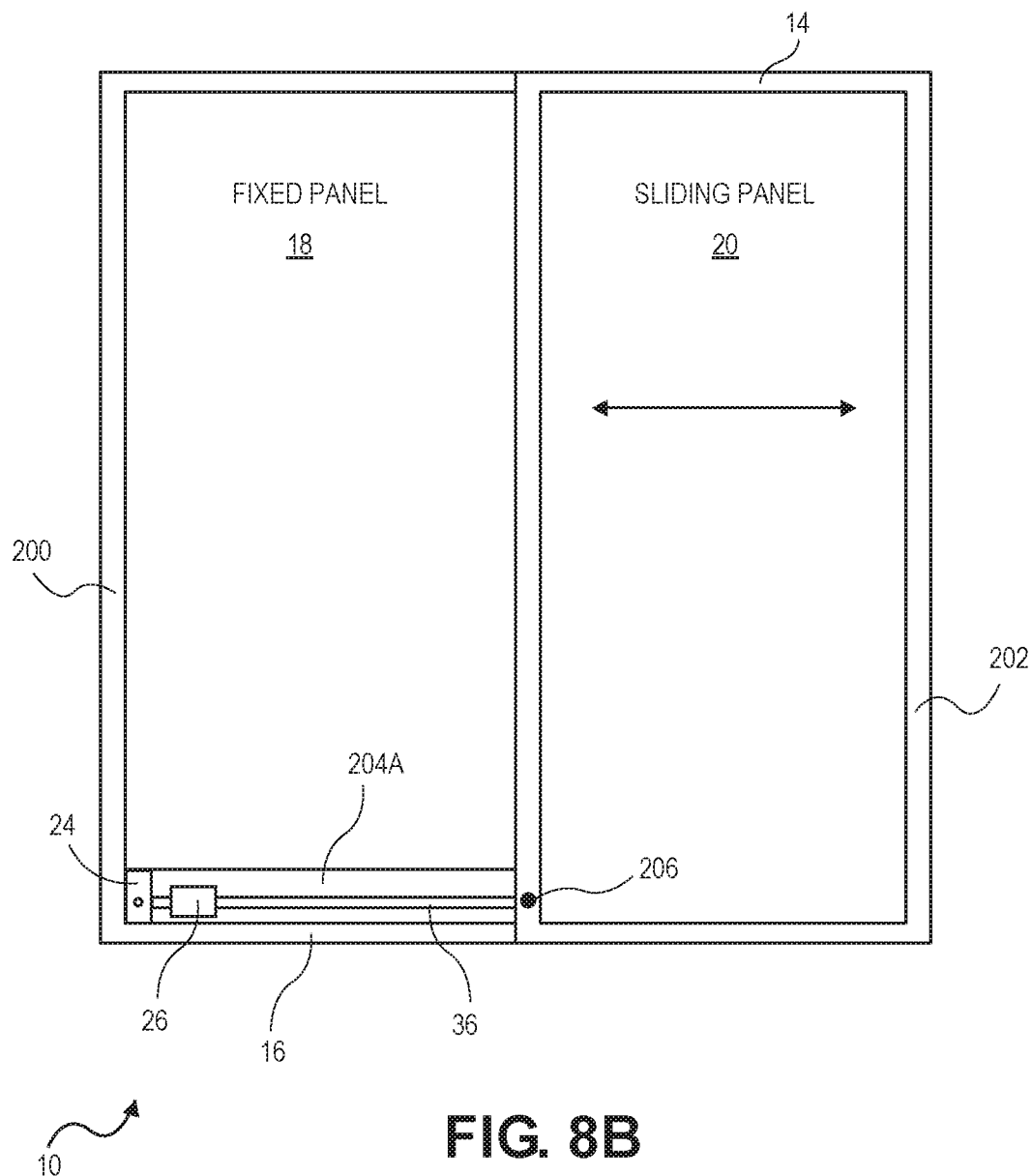
Figure 8C:
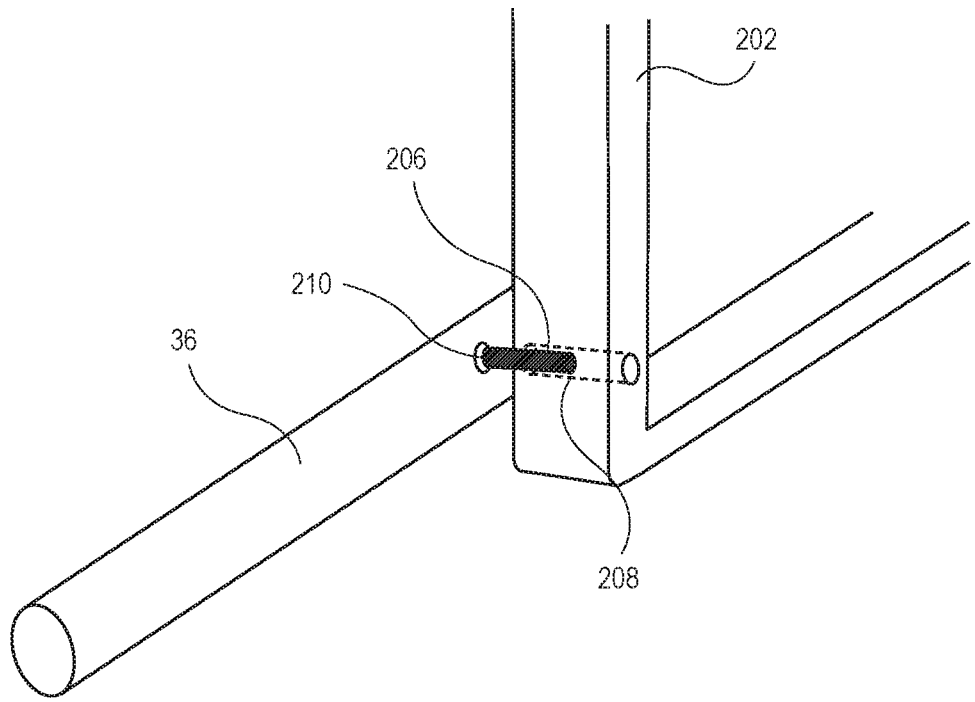

FIGS. 8A-8C illustrates another embodiment of the smart door or window opening-closing system 12 built-in or integrated into the frame of a sliding door 14. With this embodiment, the smart door or window opening-closing system 12 is integrated into the frame of the door 14 when fabricated by a door or window manufacturer.

Referring to FIG. 8A, a sliding door 14 including a track 16, a fixed frame 200 around fixed window 18 and a sliding frame 202 surrounding sliding window 20 is shown. At the bottom of the fixed frame 200, a cover 204 is provided for covering a housing or cavity (not shown) that houses the opening-closing system 12. Preferably, the exterior of the cover 204 is made of the same material (e.g., wood, vinyl or fiberglass) and is the same color as the frames 200, 202 of the sliding door 14. By matching the material and color, the cover 204 aesthetically looks like it is part of the door design and substantially conceals the opening-closing system 12. By making the cover 204 removable, access is provided to the opening-closing system 12 as needed for maintenance, repairs, etc. In alternative embodiments, the cover 204 can be fixed, meaning it is not removable.

Also shown in the diagram is a pin 206 that is used to engage or disengage the sliding frame 202 from the concealed window opening-closing system 12. When disengaged, the sliding frame 202 can be opened or closed only manually. When engaged, the sliding frame 202 can be remotely opened or closed in any of the ways already described herein.

Referring to FIG. 8B, the sliding door 14 is shown with the cover 204 removed, revealing a cavity 204A housing the opening-closing system 12, including the second base 24, housing 26 and the actuator rod 36. As detailed below, the pin 206 is either in an engaged or disengaged position with respect to the sliding frame 202.

Referring to FIG. 8C, one embodiment for implementing the pin 206 is illustrated. In this embodiment, the pin 206 is an actuator pin that is actuated by a motor (not shown), such as a solenoid, that is housed inside the actuator rod 36. In response to a control signal from the controller 52, the motor can either extend or retract the pin 206 to either engage or disengage the frame 202 from the opening-closing device 12. As evident in the diagram, when the frame 202 is in the closed position, and the pin 206 is actuated into the extended position, it extends into a recess 208 formed in the frame 202. As a result, the actuator rod 36 is engaged with the frame 202. As the actuator rod is either retracted or extended with respect to the housing 26, the sliding frame 202 is opened or closed. When the pin 206 is retracted, then the frame 202 and the actuator rod 36 are no longer engaged and the sliding frame can only be manually opened or closed.

Figure 8D:
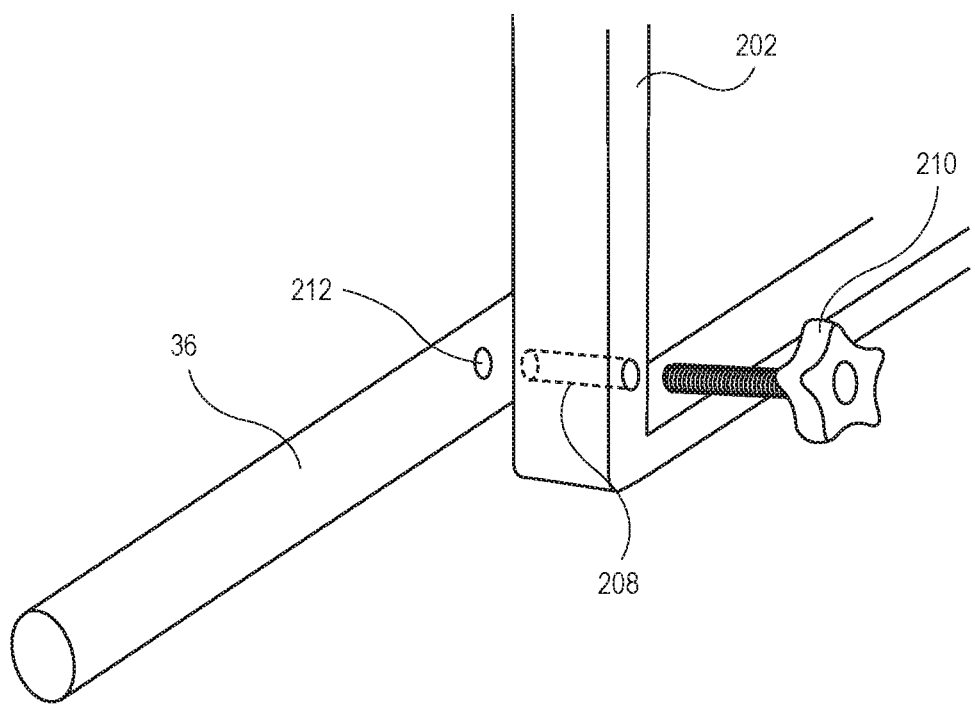

Referring to FIG. 8D, a variation of the above embodiment is shown. In this embodiment, the actuated pin 206 is replaced with a thumb-screw 210 that is designed to be manually inserted through the recess 208 formed into the frame 202 and is threaded into a hole 212 provided in the actuator rod 36. With this arrangement, the sliding frame 202 and the actuator rod 36 can be engaged or disengaged by simply screwing in or unscrewing the thumb-screw 210 from the recess 212.

Although the embodiment above is addresses to the opening-closing system 12 built into a sliding patio door, it should be understood that this is by no means a requirement. On the contrary, the opening-closing system 12 can be built into a wide variety of different types of doors and windows, including a swinging door, a sliding window, a casement window, a tilt-and-turn window, etc.

Figure 9A:
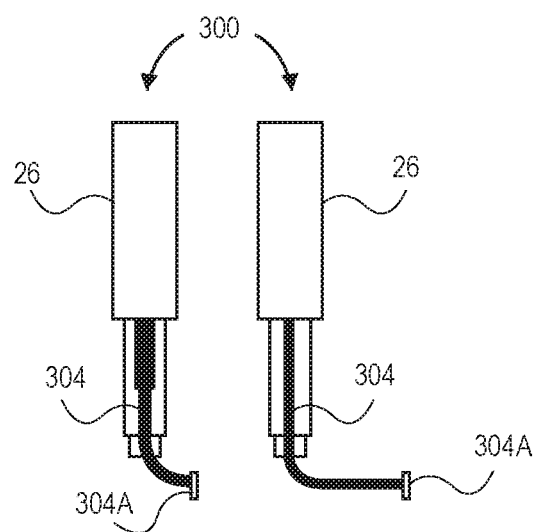
FIGS. 9A-9C illustrate another embodiment of a smart door opening-closing system for use with a swing door.
Figure 9B:
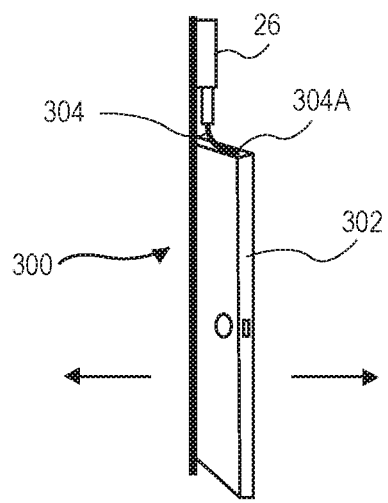
Figure 9C:
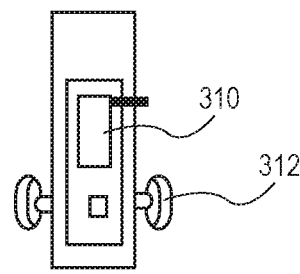

FIGS. 9A-9C illustrate another embodiment of a smart swing-door opening-closing system 300 for use with a swing door 302.

The swing-door opening closing system 300 is similar to the above-described system 12, meaning both include a house 26 for housing a sensor 28, an optional adjustable shutter 30, a screw 34 and actuator motor 32. The housing 26 further houses the controller system 50, including the controller 52, optionally the ball sensor 54, the sensor interface 56 for interfacing with the sensor 28 provided on the housing 26, the wireless network interface 58, an optional Internet of Things (IoT) interface module 60 and firmware 62. As each of these elements were previously described, an explanation of each is not provided herein for the sake of brevity.

The main difference between the previously described system 12 and the swing-door opening and closing system 300 is that the actuator rod 304 is curved. With a curve, the actuator rod 304 "bends around a corner" and laterally moves between a closed and opened position. The actuator rod 304 also includes a base 304A that is arranged to be mechanically attached to the swing door 300. The attachment can be accomplished in any of a number of ways, including screws, bolts, double-stick tape, etc.

Referring to FIG. 9A, the housing 26 and curved actuator rod 304 is illustrated. On the left side, the curved actuator rod 304 is in a retracted position. On the right side, the actuator rod 304 is shown in an laterally extended position. Thus, by (a) attaching the base 304A end of the actuator rod 304 to a swing door and (b) rotating the screw 34 in either a first rotational direction or a second rotational direction, the door can be swung open or shut by the lateral motion of the actuator rod 304.

Referring to FIG. 9B, the swing-door opening and closing system 300 is shown installed on a swing door 302. As shown, the housing 26 is attached above and onto the hinged side of the swinging door 302. The base 304A end of the curved actuator rod 304 is physically attached to the top non-hinged side of the door 302. With this arrangement, the actuator motor 32 in the housing 26 can rotate the screw 34 in either a first rotational direction or a second rotational direction. In response, the curved actuator rod moves laterally, swinging the door 302 between an opened or closed position. As described in detail herein, the door 300 can be remotely opened or closed in a variety of ways, including triggering by a pet as sensed by a PIR sensor, video camera, or identifier tag, remotely by human intervention via a voice command from a personal digital assistant, from a remote app running on a smart phone, tablet or computer, etc., as described herein. In addition, the amount or degree to which a swing door or window is opened can also be controlled, for instance, based on pet size or the size of a delivered package or envelope. The smart swing-door opening and closing system 300 can thus be used to open or close a swing door or window in all the same ways as previously described above with regard to the smart opening closing system 12.

Certain swing doors may be used with a door lock that includes a latch bolt that is arranged to inserted into a door frame latch when locked and retracted with the door lock is opened. Referring to FIG. 9C, a slide-in plate 310 is shown covering the latch bolt of a door knob 312 is illustrated. The slide-in plate 310, when inserted between the door knob and a door jam, prevents the latch bolt from engaging the door frame latch. As a result, the door can freely swing open and closed.

Although the opening and closing system 300 has been described in the context of a swinging door, it should be understood that this is by no means a requirement. The system 300 can also be used with swinging windows as well.

It should further be noted that the opening and closing door or window systems 12, 300, as described herein, can be made to be extremely strong. By making the housing 26, screw 34, actuator rod 36/304 of mechanically strong materials, such as steel, fiberglass, strong plastics, etc., a high level of safety and security can be provided. With strong materials, a door or window can be made just as difficult, if not more difficult, to open and close as a door or window lock. As such, the smart door or window opening devices as described herein provides high degree of convenience, without having to sacrifice security.

Although only a few embodiments have been described in detail, it should be appreciated that the present application may be implemented in many other forms without departing from the spirit or scope of the disclosure provided herein. Therefore, the present embodiments should be considered illustrative and not restrictive and is not to be limited to the details given herein, but may be modified within the scope and equivalents of the appended claims.

What is claimed is:

1. An opening-closing system for opening a door or window, the opening-closing system comprising:
   an actuator motor;
   an actuator screw that is rotated by the actuator motor;
   an actuator rod that is threaded onto the actuator screw; and
   a base that is attached to and between (a) a moving portion of the door or window and (b) the actuator rod,
   wherein to open the door or window, the actuator motor rotates the actuator screw in a first rotational direction, causing the actuator rod to move to a retracted position, pulling the base attached to the moving portion of the door or window toward an opened position, and
   wherein to close the door or window, the actuator motor rotates the actuator screw in a second rotational direction, causing the actuator rod to move to an extended position, pushing the base attached to the moving portion of the door or window toward a closed position.

2. The opening-closing system of claim 1, further comprising an adaptor connected to the actuator rod, the adaptor configured to:
   (a) extend the actuator rod in effective length to reach the base; and
   (b) selectively latch the actuator rod to the base, wherein the actuator rod is engaged to the base when latched and disengaged from the base when disengaged.

3. The opening-closing system of claim 2, wherein the base is configured to be attached to the moving portion of the door or window when the opening-closing system is retrofitted to operate with the door or window.

4. The opening-closing system of claim 1, further comprising multiple adaptors each configured to be selectively attached to the actuator rod, each of the adaptors having a different length for effectively extending the actuator rod to different lengths respectively.

5. The opening-closing system of claim 1, wherein the base includes a catch for catching a latch provided on the actuator rod.

6. The opening-closing system of claim 1, wherein the base is attached to the moving portion of the door or window using one of the following:
   double-stick tape;
   screws; or
   bolts.

7. The opening-closing system of claim 1, further comprising a second base configured to be attached to a non-moving portion of the door or window, wherein the non-moving portion of the door or window is a door or window frame respectively.

8. The opening-closing system of claim 1, further comprising a housing containing the actuator motor and at least a portion of the actuator screw.

9. The opening-closing system of claim 8, further comprising a connector connecting the housing to a second base attached to a non-moving portion of the door or window, the connector enabling the housing and the actuator rod to be selectively positioned in an operable position or an inoperable position.

10. The opening-closing system of claim 9, wherein the connector is a rotating connector selected from the group including:
    a hinge; or
    a rotating pin.

11. The opening-closing system of claim 1, further comprising a sensor configured to sense a presence of a person or a pet in a vicinity of the door or window.

12. The opening-closing system of claim 11, further comprising an adjustable shutter arranged to work in cooperation with the sensor, the adjustable shutter enabling an adjustment in a size of the space sensed by the sensor.

13. The opening-closing system of claim 11, wherein the sensor is selected from one of the following:
    a camera;
    a Passive Infrared Sensor (PIR); or
    a RFID tag or other interacting with blue tooth receiver.

14. The opening-closing system of claim 1, further comprising a position sensor for determining if the opening-closing system has been placed in either an operable position or an inoperable position.

15. The opening-closing system of claim 1, further comprising a controller and a network interface that enables the controller to be identified on a wireless data communication network including the Internet, share credentials with a remote communication device, and to be controlled by the remote communication device over the wireless data communication network including the Internet,
    wherein the controller is further configured to:
    (a) generate and send a notice to the remote communication device over the wireless data communication network including the Internet when a pet is sensed near or adjacent the sliding door;
    (b) receive an open or close command from the remote communication device over the wireless data communication network including the Internet; and
    (c) control the actuator motor and the actuator rod to either open or close the sliding frame in response to the received open or close command.

16. The opening-closing system of claim 1 further comprising a wireless network interface that enable wireless communication between the opening-closing system and one or more of the following:
- an application running on one of a mobile phone, a tablet computer, a desktop computer or a laptop computer,
- a voice activated personal assistant;
- an RFID tag worn by a pet or person; or
- a wireless data communication tag associated with the pet or person.

17. The opening-closing system of claim 1, wherein the opening-closing system is activated to either close or open the door or window in response to activation by a pet.

18. The opening-closing system of claim 17, wherein activation by the pet occurs by one of the following:
- triggering a sensor when the pet enters a sensed space in a vicinity of the door or window;
- sensing an RFID tag worn by the pet in the vicinity of the door or window; or
- receiving data from a wireless data communication tag worn by the pet.

19. The opening-closing system of claim 1, wherein a voice command received from a voice-activated personal digital assistant is used to command the opening-closing system to open or close the door or window.

20. The opening-closing system of claim 1, wherein the opening or closing of the door or window is remotely activated by an application running on a computing device in response to a notice that a person or a pet is sensed in a vicinity of the door or window.

21. The opening-closing system of claim 1, further configured to:
- be programmed to visibly recognize a pet;
- assign open privileges for the pet; and
- operate in cooperation with a visual recognition system including a video camera, the video recognition system recognizing the pet when in a vicinity of the door or window and, in accordance with the assigned open privileges, opening the door or window.

22. The opening-closing system of claim 1, further configured to:
- be programmed to visibly recognize a pet;
- assign no open or close privileges for the pet; and
- operate in cooperation with a visual recognition system including a video camera, the video recognition system recognizing the pet in a vicinity of the door or window and, in accordance with the no open or close privileges, not opening the door or window.

23. The opening-closing system of claim 1, further configured to operate in cooperation with a visual recognition system including a video camera, the video recognition system determining a size of a package being delivered by a delivery person by either (a) digital analysis of an image of the package or (b) from a barcode associated with the package, and:
- (c) opening the door or window an amount sufficient for the package to be placed through the door or window based on the determined sized of the package; and
- (d) closing the door or window after the package has been delivered.

24. The opening-closing system of claim 1, further configured to be retrofitted and attached onto a frame of the door or window after the door or window has been installed.

25. The opening-closing system of claim 24, further configured to be retrofitted by:
- attaching the base to the moving portion of the door or window;
- attaching the opening-closing system to a fixed portion of the door or window; and
- engaging the actuator rod to the base.

26. The opening-closing system of claim 1, wherein the door or window is a sliding door or window.

* * * * *